US006223290B1

(12) United States Patent
Larsen et al.

(10) Patent No.: US 6,223,290 B1
(45) Date of Patent: Apr. 24, 2001

(54) METHOD AND APPARATUS FOR PREVENTING THE FRAUDULENT USE OF A CELLULAR TELEPHONE

(75) Inventors: Robert E. Larsen, Shingle Springs; Peter K. Hazen, Auburn; Sandeep K. Guliani, Folsom; Robert N. Hasbun, Placerville; Sanjay S. Talreja, Folsom; Collin Ong, Sacramento; Charles W. Brown, Folsom; Terry L. Kendall, Diamond Springs, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/074,475

(22) Filed: May 7, 1998

(51) Int. Cl.$^7$ ..................................................... H04B 1/16
(52) U.S. Cl. .......................... 713/201; 455/410; 455/411; 380/270
(58) Field of Search ..................................... 455/410, 411, 455/422, 425, 435, 26.1, 32.1, 38.1; 380/49, 50, 247, 270; 713/700

(56) References Cited

U.S. PATENT DOCUMENTS

| 5,239,294 | * | 8/1993 | Flanders et al. | 340/825.34 |
|---|---|---|---|---|
| 5,337,345 | * | 8/1994 | Cassidy et al. | 379/58 |
| 5,384,847 | * | 1/1995 | Hendrickson et al. | 380/23 |
| 5,612,682 | * | 3/1997 | DeLuca et al. | 340/825.34 |
| 5,703,950 | * | 12/1997 | Jovanovich et al. | 380/23 |
| 5,850,444 | * | 12/1998 | Rune | 380/21 |
| 5,887,250 | * | 3/1999 | Shah | 455/411 |

* cited by examiner

Primary Examiner—Tod R. Swann
Assistant Examiner—Paul E. Callahan
(74) Attorney, Agent, or Firm—Blakely, Sokoloff, Taylor & Zafman LLP

(57) ABSTRACT

A method and apparatus for controlling use of an electronic system is described. Use of the electronic system is controlled by programming at least one unique code into an auxiliary memory of the electronic system. The auxiliary memory is a permanently lockable memory that is located outside of a main memory array space. The unique code is compared to at least one component code. Use of the electronic system is controlled based on a predefined relationship between the unique code and the component code.

49 Claims, 8 Drawing Sheets

Word-Wide Protection Register Addressing

| Word | Use | A7 | A6 | A5 | A4 | A3 | A2 | A1 | A0 |
|---|---|---|---|---|---|---|---|---|---|
| LOCK | Both | 1 | 0 | 0 | 0 | 0 | 0 | 0 | 0 |
| 0 | Factory | 1 | 0 | 0 | 0 | 0 | 0 | 0 | 1 |
| 1 | Factory | 1 | 0 | 0 | 0 | 0 | 0 | 1 | 0 |
| 2 | Factory | 1 | 0 | 0 | 0 | 0 | 0 | 1 | 1 |
| 3 | Factory | 1 | 0 | 0 | 0 | 0 | 1 | 0 | 0 |
| 4 | User | 1 | 0 | 0 | 0 | 0 | 1 | 0 | 1 |
| 5 | User | 1 | 0 | 0 | 0 | 0 | 1 | 1 | 0 |
| 6 | User | 1 | 0 | 0 | 0 | 0 | 1 | 1 | 1 |
| 7 | User | 1 | 0 | 0 | 0 | 1 | 0 | 0 | 0 |

Fig. 4

Byte-Wide Protection Register Addressing

| Byte | Use | A11 | A7 | A6 | A5 | A4 | A3 | A2 | A1 | A0 |
|---|---|---|---|---|---|---|---|---|---|---|
| LOCK | Both | 0 | 1 | 0 | 0 | 0 | 0 | 0 | 0 | 0 |
| 0 | Factory | 1 | 1 | 0 | 0 | 0 | 0 | 0 | 0 | 0 |
| 1 | Factory | 0 | 1 | 0 | 0 | 0 | 0 | 0 | 0 | 1 |
| 2 | Factory | 1 | 1 | 0 | 0 | 0 | 0 | 0 | 0 | 1 |
| 3 | Factory | 0 | 1 | 0 | 0 | 0 | 0 | 0 | 1 | 0 |
| 4 | Factory | 1 | 1 | 0 | 0 | 0 | 0 | 0 | 1 | 0 |
| 5 | Factory | 0 | 1 | 0 | 0 | 0 | 0 | 0 | 1 | 1 |
| 6 | Factory | 1 | 1 | 0 | 0 | 0 | 0 | 0 | 1 | 1 |
| 7 | Factory | 0 | 1 | 0 | 0 | 0 | 0 | 1 | 0 | 0 |
| 8 | User | 1 | 1 | 0 | 0 | 0 | 0 | 1 | 0 | 0 |
| 9 | User | 0 | 1 | 0 | 0 | 0 | 0 | 1 | 0 | 1 |
| 10 | User | 1 | 1 | 0 | 0 | 0 | 0 | 1 | 0 | 1 |
| 11 | User | 0 | 1 | 0 | 0 | 0 | 0 | 1 | 1 | 0 |
| 12 | User | 1 | 1 | 0 | 0 | 0 | 0 | 1 | 1 | 0 |
| 13 | User | 0 | 1 | 0 | 0 | 0 | 0 | 1 | 1 | 1 |
| 14 | User | 1 | 1 | 0 | 0 | 0 | 0 | 1 | 1 | 1 |
| 15 | User | 0 | 1 | 0 | 0 | 0 | 1 | 0 | 0 | 0 |

Fig. 5

| Item | Address | Data |
|---|---|---|
| Manufacturer Code (x16) | 00000 | 0089 |
| Manufacturer Code (x8) | 00000 | 89 |
| Device ID | 00001 | ID |
| Block Lock Configuration | XX002 | LOCK |
| • Block is Unlocked | | $DQ_0=0$ |
| • Block is Locked | | $DQ_0=1$ |
| • Block is Locked-Down | | $DQ_1=1$ |
| Protection Register Lock | 80 | PR-LK |
| Protection Register (x16) | 81-88 | PR |
| Protection Register (x8) | | PR |

Fig. 6

METHOD AND APPARATUS FOR PREVENTING THE FRAUDULENT USE OF A CELLULAR TELEPHONE

FIELD OF THE INVENTION

The present invention relates generally to preventing the fraudulent use of a cellular telephone and, more particularly, to a unique identification scheme for fraud prevention.

BACKGROUND OF THE INVENTION

Wireless communications have shown a profound effect on society today. In only a few short years, cellular telephones have attracted millions of subscribers in the United States, Europe, and Asia. While this dramatic development is just the start of the telecommunications revolution, it is also just the start of a revolution in piracy and fraudulent use of cellular telephones.

The typical prior art cellular telephone uses nonvolatile writeable memory to store either data, or code, or both. Such nonvolatile writeable memories include Electrically Erasable Programmable Read-Only Memories (EEPROMs) and flash Erasable and Electrically Programmable Read-Only Memories (flash EPROMs, or flash memories). The flash memory of the typical prior art cellular telephone comprises an equipment serial number (ESN) or international mobile equipment identifier (IMEI). When the cellular telephone is operated, the ESN or IMEI is broadcasted to allow the cellular service provider to identify the user as a legitimate subscriber in order to provide the user with access to the cellular network and to bill the user for the access to the network. Fraudulent cloning occurs when the ESN or IMEI is obtained by fraudulent means and reprogrammed into another cellular telephone in an effort to avoid paying for cellular telephone service. Furthermore, embedded systems face a similar problem whereby application code is read from a flash memory in an effort to reverse engineer the product.

Piracy or fraud occurs in the typical prior art analog cellular phone when the analog signal transmitted from the cellular telephone is intercepted and decoded to provide the cellular pirate with the ESN or IMEI of the broadcasting user. The cellular pirate then uses the acquired ESN or IMEI by programming it into other analog cellular telephones. When these fraudulently cloned cellular telephones are used, the airtime is billed against the pirated ESN or IMEI.

Another opportunity for cellular piracy arises when cellular telephone hardware is subsidized by different service providers abroad. For example, a service provider in England may provide a cellular telephone to a subscriber at a cost of $200 with a two year service subscription. In contrast, a service provider in Finland may provide a cellular telephone to a subscriber at a cost of $1,000 with a two month service subscription. Therefore, the cellular telephone has a significantly different value depending on the country in which it is used. The fraud opportunity that arises is for a cellular pirate to purchase cellular telephones in England at a cost of $200 and take them to Finland where they are sold for an amount less than $1,000 but significantly more than the $200 purchase price.

As there is not a standard hardware security protection scheme, each OEM must implement their own fraud prevention scheme. Some OEMs of cellular telephones make no effort to prevent cellular piracy. One fraud-prevention technique used by some OEMs in a typical prior art cellular telephone is to bury a unique code in the cellular telephone system software memory space. The system software knows the address of the code and uses this code to access the system software. The problem with this technique is that it is easily defeated by erasing the entire memory and installing new system software and reprogramming the same identification that was originally in place.

Another problem in the typical prior art Global System for Mobile Communications (GSM) cellular telephone is in the fraudulent use of the subscriber identification module (SIM) card, or smart card. The SIM card, the size of a credit card, slots into the cellular telephones allowing their users to make or receive calls while abroad but be billed when they get back home. While the SIM cards are designed for use with GSM cellular telephones, there has been consideration of allowing the SIM cards to be used with non-GSM phones such as card-operated public pay phones. However, fears that fraudulent abuse of the SIM card may be too difficult to prevent are placing ever increasing restrictions on its usefulness.

The GSM smart card carries the information required for users to make calls on GSM networks other than the one to which they subscribe. This is especially useful when traveling abroad, theoretically allowing users to make or receive calls almost no matter where they travel throughout Europe and increasingly also outside of Europe. However, fraud and the apparent inability of network operators to deal with it has meant that an increasing number of service providers, the group in the middle between the operators and mobile phone users, are now deliberately limiting the usefulness of the GSM SIM card. These limitations include limiting the SIM card to functioning only with the phone with which it was provided, a limitation that virtually eliminates the initial purpose of the smart card. Furthermore, some service providers, as a result of cellular telephone piracy, have proposed eliminating the SIM cards altogether, the argument being that it introduces a new level of complexity which criminals can exploit.

As a result of substantial losses incurred by foreign service network operators, a number of foreign service providers in a number of foreign countries are now disabling the GSM SIM cards from being allowed to be used while abroad. From now on subscribers to networks through those service providers will have to leave large deposits if they want to use their phones while abroad. Furthermore, some foreign service providers have now ceased all international roaming.

SUMMARY OF THE INVENTION

A method and apparatus for controlling use of an electronic system is described. Use of the electronic system is controlled by programming at least one unique code into an auxiliary memory of the electronic system. The auxiliary memory is a permanently lockable memory that is located outside of a main memory array space. The unique code is compared to at least one component code. Use of the electronic system is controlled based on a predefined relationship between the unique code and the component code.

Other features and advantages of the present invention will be apparent from the accompanying drawings and from the detailed description and appended claims that follow below.

BRIEF DESCRIPTION OF THE DRAWINGS

The present invention is illustrated by way of example and not limitation in the figures of the accompanying drawings, in which like references indicate similar elements and in which:

FIG. 4 is the allowable word-wide addressing for the protection register of one embodiment.

FIG. 5 is the allowable byte-wide addressing for the protection register of one embodiment.

FIG. 6 is a Read Configuration table of the flash memory device of one embodiment.

DETAILED DESCRIPTION

Figure 1:
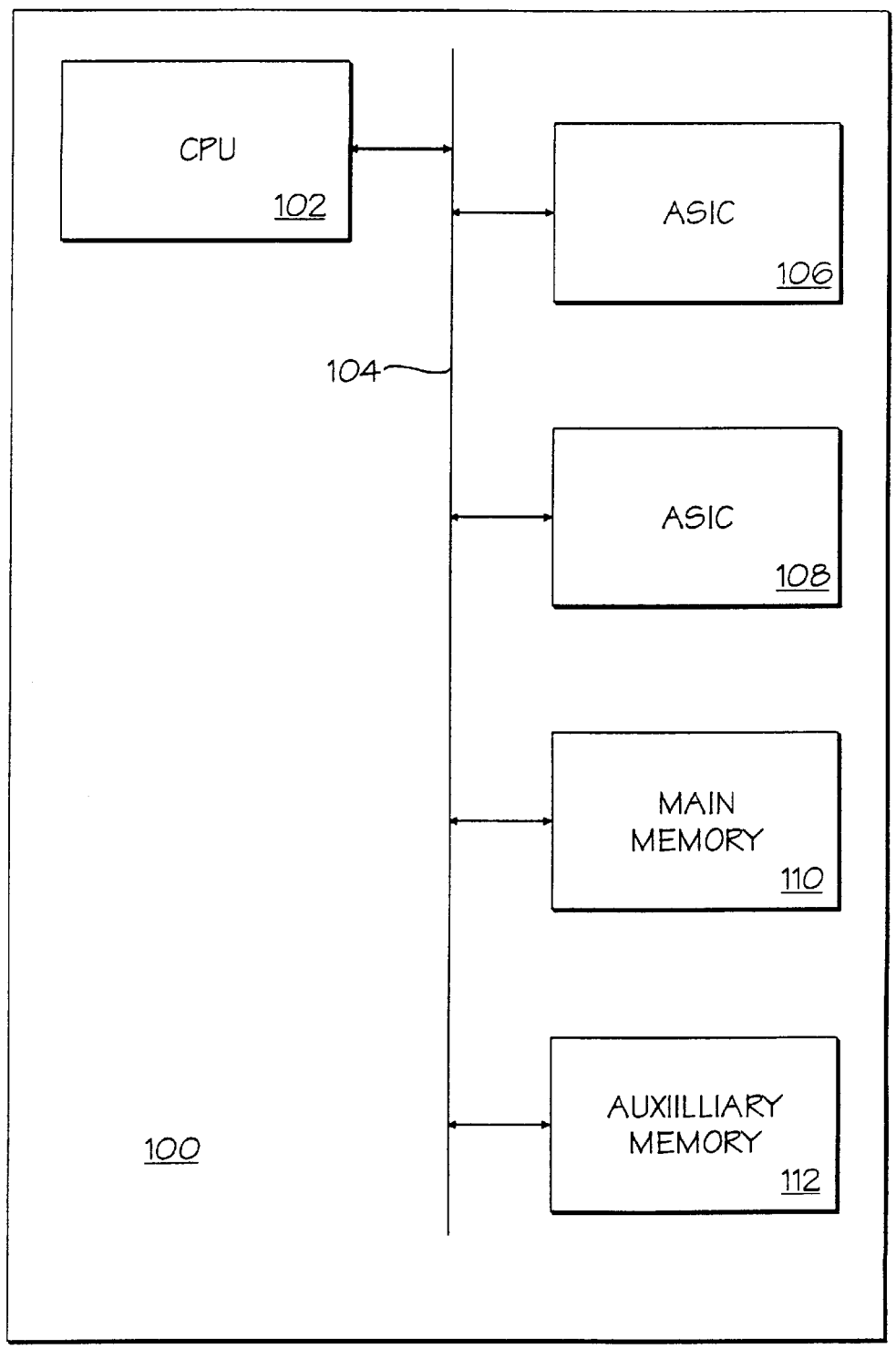
FIG. 1 is an electronic system comprising the fraud prevention circuitry of one embodiment.

A method and apparatus for controlling use of and access to an electronic system is described. Specifically, a method and apparatus for preventing the fraudulent use of a cellular telephone is described, wherein a unique identification scheme is provided for a memory device that allows an identification code to be read in an electronic application but not modified. In one embodiment, a cellular telephone OEM is provided a memory device having a unique identification code, or number, set in a permanently lockable memory, or one-time programmable (OTP) memory space, by the memory device manufacturer. In an alternate embodiment the cellular telephone OEM sets a unique identification (ID) code in a One-Time Programmable (OTP) memory space of the flash memory. The identification code in the OTP memory space is not modifiable in either embodiment.

In the operation of both embodiments, the cellular telephone system software checks for a match between the unique identification code of the OTP memory space and another component code before allowing telephone calls to be placed using the cellular telephone. Intended advantages of the fraud prevention circuitry can include prevention of fraudulent cloning of cellular telephones and prevention of the theft of cellular air time and phone subsidies. Furthermore, intended advantages comprise preventing access to electronic systems, preventing the use of stolen computers, preventing the illegal or unauthorized use of computers, and increasing the security of electronic system designs by preventing application code from being read from the memory of such systems. Moreover, the unique identification code of the memory device of one embodiment may be used as an enabler to improve prior art cellular telephone fraud cloning prevention techniques.

As previously discussed herein, one type of fraudulent cloning of cellular telephones occurs when the cellular telephones of one cellular service provider are modified to work with a different cellular service provider. Typically, this is done by removing and replacing or erasing and reprogramming the memory of the cellular telephone, as the memory contains the cellular telephone software that is specific to a particular cellular service provider. Fraudulent cloning of cellular telephones can be prevented by tying together, or linking, the cellular telephone memory, the cellular telephone hardware, and the cellular telephone micro controller. This linking prevents fraudulent cloning by locking the hardware of a particular cellular telephone to a particular service provider. Thus, the method and apparatus described and claimed herein provides a solution to the prior art piracy by helping the OEM and the service provider track the actual phone from which a database can be setup, wherein it prevents the user or fraudulent dealer from modifying the ESN or IMEI or other electronic identification code.

The fraud prevention device of one embodiment provides two opportunities to have a unique identifier code within the flash memory device. The cellular telephone OEM may use one or both of the codes as part of an encryption mechanism or handshaking mechanism of the cellular telephone system software in handshaking between the flash memory, the flash memory code resident in the flash memory, and the micro controller or central processor of the cellular telephone. If a different memory device has been substituted into the cellular telephone, the alignment cannot be verified and access to the cellular network using the cellular telephone is prohibited.

FIG. 1 is an electronic system 100 comprising the fraud prevention circuitry of one embodiment. The electronic system 100 comprises a central processor unit (CPU) 102 coupled to a bus 104. A number of applicationspecific integrated circuits (ASICs) 106–108 may be coupled to the bus 104 to enable the functions of the particular electronic system 100, but the embodiment is not so limited. A main memory 110 is coupled to the bus 104 along with an auxiliary memory 112. The auxiliary memory 112 is a small memory array located outside of the main memory array space 110. As such, the auxiliary memory 112 is dedicated to storing at least one unique identifier code. In one embodiment, the main memory 110 is a flash memory, but the embodiment is not so limited. Furthermore, the auxiliary memory 112 may be a flash memory, but the embodiment is not so limited. While the electronic system 100 security is optimized by placing the auxiliary memory 112 on the same chip as the main memory array 110, the embodiment is not so limited. In one embodiment, the electronic system 100 comprises a cellular telephone. In an alternate embodiment, the electronic system 100 comprises a computer-based electronic system. While the description that follows herein will use the cellular telephone example of the electronic system 100, the embodiment is not so limited.

Figure 2:
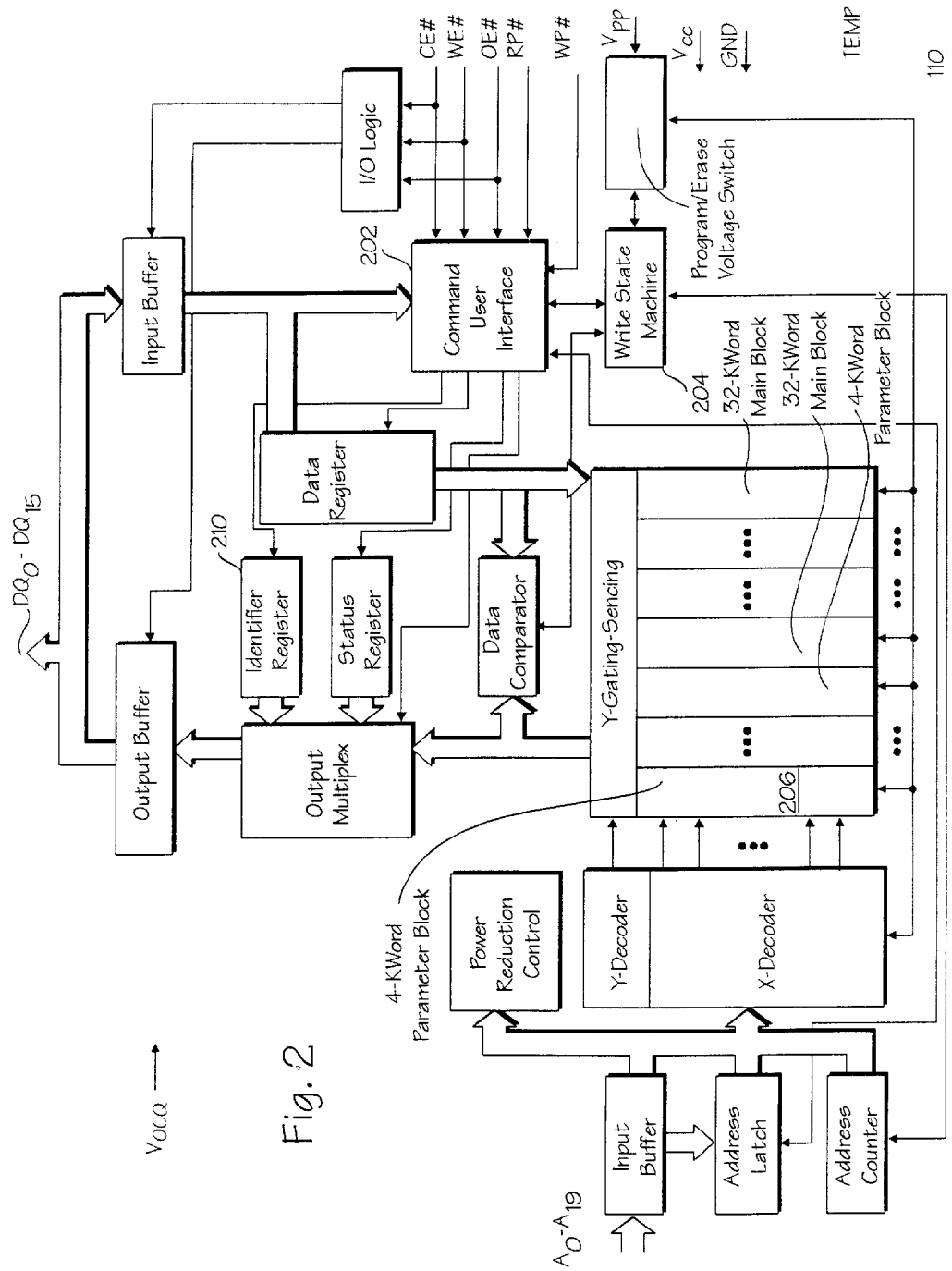
FIG. 2 is a block diagram of the flash memory device of one embodiment.

FIG. 2 is a block diagram of the flash memory device 110 of one embodiment. A Command User Interface (CUI) 202 serves as the interface between the microprocessor or micro controller of the cellular telephone and the internal operation of the flash memory device 110. A Write State Machine (WSM) 204 automatically executes the algorithms and timings necessary for program and erase operations, including verification. Therefore, the flash memory device 110 reads, programs, and erases in-system via the CPU or micro controller of the cellular telephone. Commands provided to the CUI 202 allow the user to access the main flash array 206 and, alternatively, the One-Time Programmable (OTP) registers 210.

The memory device of one embodiment comprises an register 210 of the auxiliary memory that is used to prevent fraud and to increase the security of a system design. The OTP register 210, or protection register, comprises a 128-bit number stored in an internal location of the device. The 128-bit protection register allows unique flash memory device identification, wherein the 128-bit number may be used for fraud prevention in electronic devices such as cellular telephones, but the embodiment is not so limited.

For example, the number contained in the protection register can be used to mate the flash component with other system components comprising the CPU, an ASIC, and a signal processor, preventing device substitution, but the embodiment is not so limited.

Figure 3:
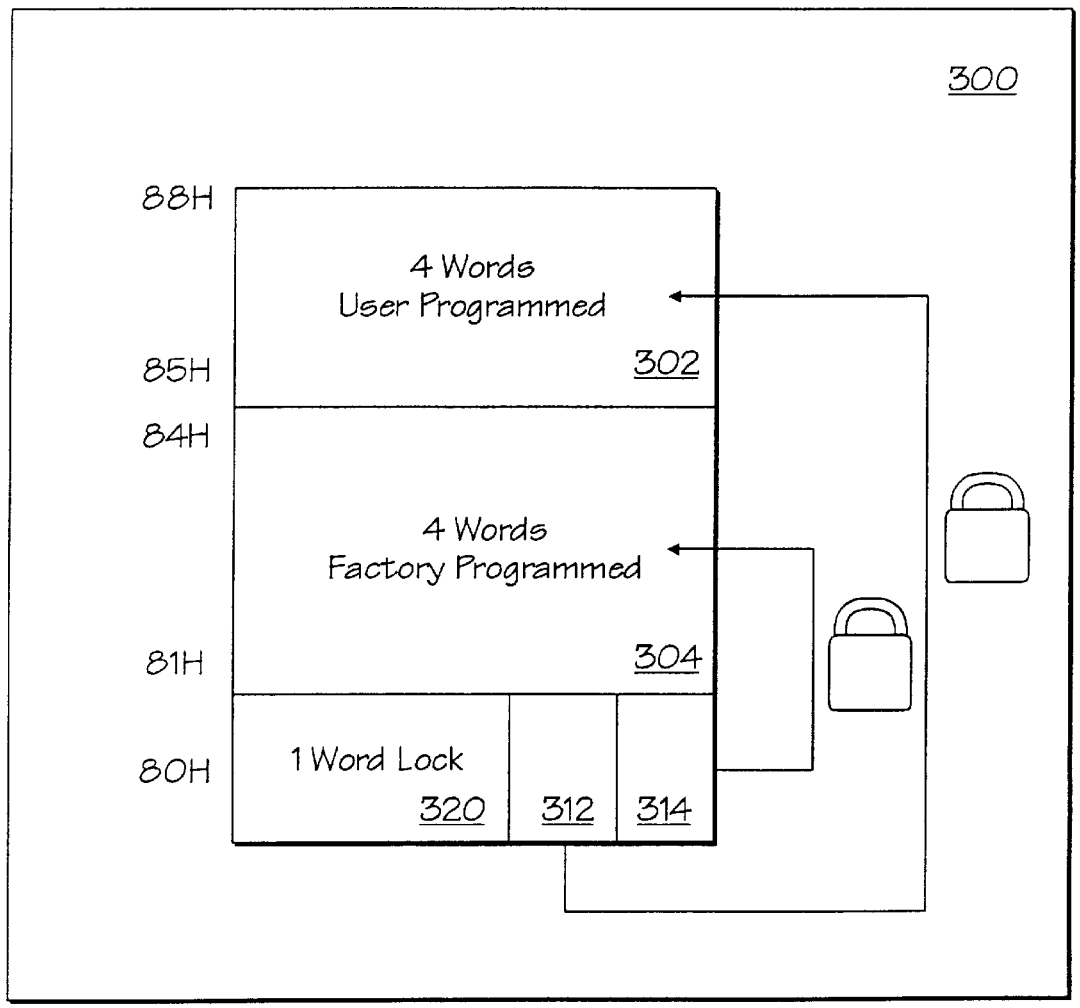
FIG. 3 is a memory map of the OTP register, or protection register, of one embodiment.

FIG. 3 is a memory map of the OTP register, or protection register, of one embodiment. The 128-bit protection register 300 comprises two segments 302–304, wherein each segment comprises 64 bits, but the embodiment is not SO limited. The first segment 302 of the protection register 300 comprises a unique part number that is pre-programmed by the memory device manufacturer at the time of manufacture. The number is unique for each device manufactured. In one embodiment, this pre-programmed number (64 bits) is derived using some combination comprising the fab identification (ID) (8 bits), the lot ID (32 bits), the wafer ID (8 bits), the X location of the die on the wafer (8 bits), and the Y location of the die on the wafer (8 bits), but the embodiment is not so limited. The unique identification number may be encrypted, but the embodiment is not so limited. Once programmed, the contents of the first segment 302 of the protection register 300 are unchangeable because the first segment 302 of the protection register 300 is locked.

The OTP memory space 300, or protection register, is lockable in two sections. Following the programming of the manufacturer-programmable segment of the protection register 300, the first segment 302 or the first 64 bits (4 words or 8 bytes) of the protection register 300, the first segment 302 of the OTP memory space 300 is locked by writing an additional lock bit 312. The first segment 302 of the OTP memory space 300 is locked by using the OTP Protection Program command to program, or write, "FFFE" (word-wide) or "FE" (byte-wide) to the LOCK address location 320. This command programs, or sets, bit 0 of the PR-LOCK location 312 to 0, wherein the first 64-bits 302 are locked out. After setting the lockout bits 312–314, no further changes are allowed to the values stored in the respective segments of the protection register. Attempts to program a locked protection register segment result in a Status Register error. The protection register lockout state is not reversible, but the embodiment is not so limited.

The second segment of the protection register 304 comprises a segment that is programmable by the user to a value selected by the user. The protection register bits are programmed by the user using a two-cycle Protection Program, or OTP Program, command. The 64-bit register value is programmed 16 bits at a time for word-wide parts and 8 bits at a time for byte-wide parts. In programming the protection register 300, a Protection Program Setup command, COH is written during the first cycle. The first cycle prepares the CUI for an OTP Program operation. The second cycle latches addresses and data information and initiates the write state machine to execute the OTP Program algorithm to the OTP register, wherein the subsequent write to the memory device programs the specified location of the OTP register. FIG. 4 is the allowable word-wide addressing for the protection register of one embodiment. FIG. 5 is the allowable byte-wide addressing for the protection register of one embodiment. A Read Array command is used to read array data following programming. Attempts to address Protection Program commands outside the defined protection register address space results in a Status Register error.

Following the programming of the user-programmable segment of the protection register, the second segment 304 or the second 64 bits of the protection register 300, the second segment 304 of the OTP memory space 300 is locked by writing an additional lock bit 314. The second segment 304 of the OTP memory space 300 is locked by using the OTP Protection Program command to program, or write, "FFFD" (word-wide) or "FD" (byte-wide) to the "LOCK" address location 320. This command programs, or sets, bit 1 of the PR-LOCK location 314 to 0, wherein the second 64-bits 304 are locked out. After setting the lockout bits 312–314, no further changes are allowed to the values stored in the respective segments of the protection register. Attempts to program a locked protection register segment result in a Status Register error. The protection register lockout state is not reversible, but the embodiment is not so limited.

The flash memory device of one embodiment has two write modes and four read modes. The two write modes comprise Program and Block Erase. The four read modes comprise Read Array, Read Configuration, Read Status, and Read Query. The appropriate read mode command is issued to the CUI to enter the corresponding read mode. The protection register is read in the Read Configuration mode and, as such, is not addressable in the memory array.

The Read Configuration mode outputs the manufacturer/device identifier and the contents of the protection register, the one-time programmable (OTP) fraud prevention number. The device is switched to the Read Configuration mode by writing the Read Configuration command, 90H, to the CUI. FIG. 6 is a Read Configuration table of the flash memory device of one embodiment. The Read Configuration table is a table of the specified information retrieved in the Read Configuration mode during read cycles from the addresses shown of the flash memory device. Once in the Read Configuration mode, read cycles from the addresses of FIGS. 4 and 5 retrieve the values in the protection register.

Figure 7:
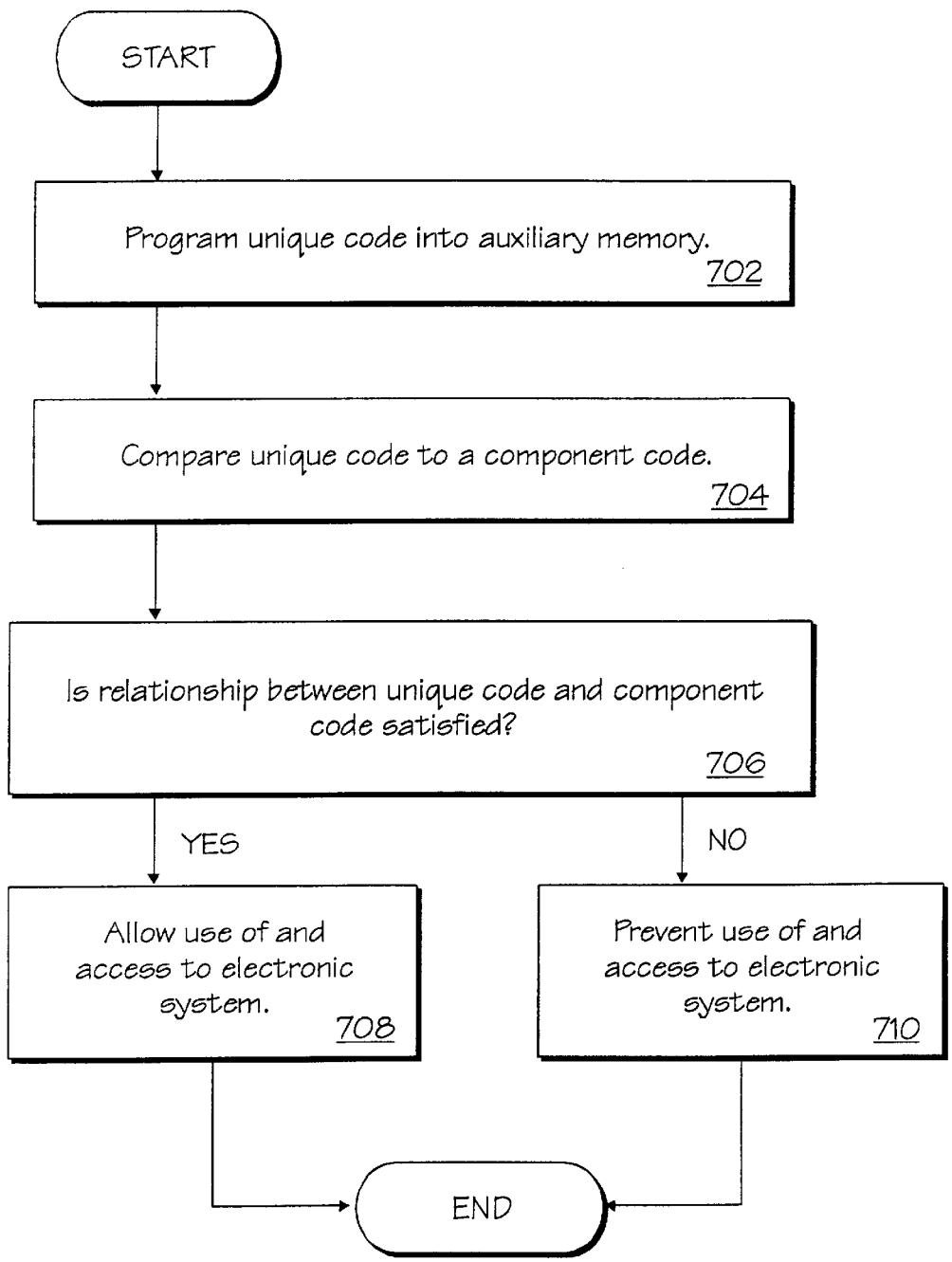
FIG. 7 is a flowchart of the electronic system control method of one embodiment.

FIG. 7 is a flowchart of the electronic system control method of one embodiment. Operation begins at step 702, at which at least one unique code is programmed into an auxiliary memory of the electronic system. The auxiliary memory is a permanently lockable memory located outside of a main memory array space. The auxiliary memory may be located in a configuration memory space, but the embodiment is not so limited. The unique code is compared to at least one component code, at step 704. Use of the electronic system is controlled based on a predefined relationship between the unique code and the component code. A determination is made, at step 706, as to whether the predefined relationship is satisfied. In one embodiment, the predefined relationship is a match between the unique code and the component code, but the embodiment is not so limited. If the predefined relationship is satisfied, then use of or access to the electronic system is permitted, at step 708. If the predefined relationship is not satisfied, then use of the electronic system is not permitted, at step 710.

The electronic system comprises cellular telephones, embedded systems, and set-top boxes, but the embodiment is not so limited. The main memory of one embodiment is a flash memory. The auxiliary memory of one embodiment is a flash memory. In one embodiment, the main memory and the auxiliary memory are located on the same integrated circuit, or chip, but the embodiment is not so limited. In an alternate embodiment, the auxiliary memory is accessible using a serial port and an input/output (I/O) port.

In one embodiment, the unique code is stored in a segment of the auxiliary memory while the component code is set, or stored, in a one-time programmable memory of at least one component of the electronic system. The component of the electronic system may comprise a memory, a micro controller, an application-specific integrated circuit, a central processor unit, a signal processor, and a subscriber identification module (SIM) card, but the embodiment is not so limited.

In an alternate embodiment, the unique code is stored in a first segment of the auxiliary memory and the component code is stored in a second segment of the auxiliary memory, but the embodiment is not so limited. In this alternate embodiment, the unique code is used to encrypt an identification code. The identification code may comprise at least one bit stored in the main memory of the electronic system. Furthermore, the identification code, or number, may comprise an identifier code resident in system software of the electronic system. The encrypted identification code is compared to the component code stored in the auxiliary memory. Use of and access to the electronic system is disabled when the encrypted identification code does not match the component code.

In another alternate embodiment, the component code is used to encrypt the identification code. The encrypted identification code is compared to the unique code stored in the auxiliary memory. Use of and access to the electronic system is disabled when the encrypted identification code fails to match the unique code.

In another alternate embodiment, the component code is encrypted using the unique code. Use of and access to the electronic system is disabled when the encrypted component code fails to match at least one code stored in a main memory or system software of the electronic system.

Figure 8:
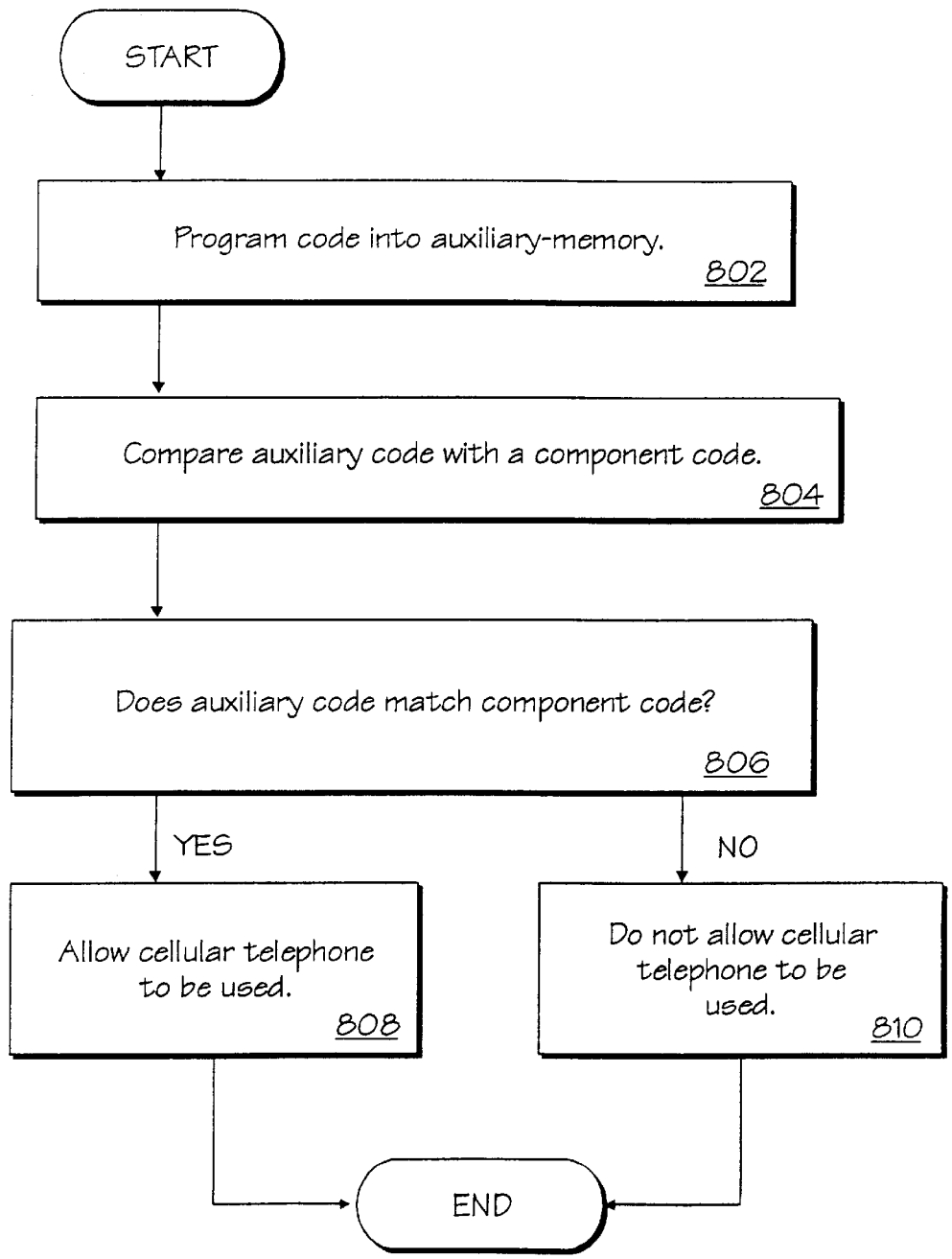
FIG. 8 is a flowchart of the fraud prevention method of one embodiment.

FIG. 8 is a flowchart of the fraud prevention method of one embodiment. Operation begins at step 802, at which a unique code is programmed into a protection register of an auxiliary memory of the cellular telephone. As previously discussed herein, the auxiliary memory is a permanently lockable memory, or one-time programmable memory. As previously discussed herein, a unique code is programmed into a first 64-bit segment of the protection register by the memory device manufacturer and a lock bit is set, wherein modification of the unique code is prohibited. Upon receipt of the memory device by the cellular telephone OEM, the unique code as set by the manufacturer may be used to protect the cellular telephone against fraudulent cloning. Furthermore, a second 64-bit segment of the protection register is provided, wherein a unique code may be programmed by the cellular telephone OEM. Following programming of a unique code by the cellular telephone OEM a lock bit is set, wherein modification of the unique code is prohibited. Either or both of the programmed codes may be used by the cellular telephone OEM in a fraud prevention scheme.

The unique code is compared with a component code, at step 804. Use of the cellular telephone is controlled based on a predefined relationship between the unique code and the component code. A determination is made, at step 806, as to whether the predefined relationship is satisfied. In one embodiment, the predefined relationship is a match between the unique code and the component code that is verified by a software query, but the embodiment is not so limited. If the predefined relationship is satisfied, then use of the cellular telephone is permitted, at step 808. If the predefined relationship is not satisfied, then use of the cellular telephone is not permitted, at step 810. In an alternate embodiment, when the predefined relationship is not satisfied, limited activation of the cellular telephone may be allowed for tracking purposes, but the embodiment is not so limited. In an alternate embodiment, when the predefined relationship is not satisfied, a message may be displayed informing the user to contact the cellular service provider.

The predefined relationship between the unique code and the component code may be a match between the codes, but the embodiment is not so limited. In alternate embodiments, use of the cellular telephone may be controlled by using the component code to encrypt or decrypt the unique code. In other alternate embodiments, use of the cellular telephone may be controlled by using the unique code to encrypt or decrypt the component code. In additional alternate embodiments, use of the cellular telephone may be controlled by using the unique code and the component code as an encryption validation key for cellular telephone system software.

In one embodiment, the unique code is stored in a segment of the auxiliary memory while the component code is set, or stored, in a permanently lockable or one-time programmable memory of at least one component of the cellular telephone. The component code may be programmed by the cellular telephone OEM or by the cellular service provider. Alternatively, the cellular telephone OEM may program a component code as provided by the cellular service provider. In this manner, a number of components of the cellular telephone are linked together, thereby preventing use of the cellular telephone when a linked component, for example a flash memory, is removed and replaced with a different component. The component of the cellular telephone may comprise a memory, a micro controller, an application-specific integrated circuit, a central processor unit, and a signal processor, but the embodiment is not so limited. A Global System for Mobile Communications (GSM) cellular telephone uses a portable subscriber identification module (SIM) card that carries the personal information of a user including, but not limited to, billing data, phone book, and call handling preferences. In this GSM system, as the SIM card can be used in another phone, a component code may be set in a component of the cellular telephone infrastructure, wherein the infrastructure comprises a user profile resident in the SIM card.

In an alternate embodiment, the unique code is stored in a first segment of the auxiliary memory and the component code is stored in a second segment of the auxiliary memory, but the embodiment is not so limited. In this alternate embodiment, the unique code is used to encrypt an identification number. The identification number may comprise an ESN, an IMEI, and a number provided by a cellular service provider in a signal received by the cellular telephone from a cellular base station. Furthermore, the identification number may comprise a number stored in the main memory of the electronic system. Moreover, the identification number may comprise an identifier number resident in system software of the electronic system. The encrypted identification number is compared to the component code stored in the auxiliary memory. Use of the cellular telephone is allowed when the encrypted identification number matches the component code.

In another alternate embodiment, the cellular telephone service provider can read the unique code from the cellular telephone and program the unique code into the GSM SIM card in an encrypted manner. The cellular telephone software will compare the unique code with the programmed code upon attempted activation of the cellular telephone. Alternatively, a code resident in a memory of the GSM SIM card could be programmed into the permanently lockable memory, wherein the cellular telephone software will compare the two codes.

In one embodiment, use of the cellular telephone is prevented by prohibiting access to the main memory of the cellular telephone, but the embodiment is not so limited. In an alternate embodiment, use of the cellular telephone is allowed by using the unique code and the component code to decrypt the system software of the cellular telephone. In another alternate embodiment, use of the cellular telephone is allowed by using the unique code along with an encryption key.

Although the detailed description describes embodiments using a flash EPROM, the invention may be used with any nonvolatile writeable memory. While the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for controlling use of an electronic system, the method comprising the steps of:
   programming at least one unique code into an auxiliary memory of the electronic system, wherein the auxiliary memory is a lockable memory; and
   comparing the at least one unique code to at least one component code; and
   controlling use of the electronic system based on a predefined relationship between the at least one unique code and the at least one component code.

2. The method of claim 1, further comprising the step of disabling use of the electronic system and disabling access to the electronic system when the at least one unique code does not match the at least one component code.

3. The method of claim 1, further comprising the steps of:
   encrypting an identification code using the at least one unique code; and
   disabling use of the electronic system and disabling access to the electronic system when the encrypted identification code does not match the at least one component code.

4. The method of claim 3, wherein the identification code comprises at least one bit stored in a main memory of the electronic system.

5. The method of claim 3, wherein the identification code comprises at least one bit resident in system software of the electronic system.

6. The method of claim 1, further comprising the steps of:
   encrypting the at least one component code using the at least one unique code; and
   disabling use of the electronic system and disabling access to the electronic system when the encrypted at least one component code does not match at least one code stored in a main memory of the electronic system.

7. The method of claim 3, wherein the at least one unique code is stored in a first segment of the auxiliary memory and the at least one component code is stored in a second segment of the auxiliary memory.

8. The method of claim 1, further comprising the step of setting the at least one component code in a one-time programmable memory of at least one component of the electronic system.

9. The method of claim 8, wherein the at least one component comprises a micro controller, an application specific integrated circuit, a central processor unit, a signal processor, and a subscriber identification module (SIM) card.

10. The method of claim 1, wherein the electronic system comprises a cellular telephone.

11. The method of claim 1, wherein the main memory is a flash memory.

12. The method of claim 1, wherein the main memory and the auxiliary memory are located on the same chip.

13. The method of claim 1, wherein the lockable memory is a one-time programmable memory.

14. The method of claim 1, wherein the auxiliary memory is located outside of a main memory array space.

15. The method of claim 2, wherein the electronic system is an embedded system.

16. The method of claim 2, wherein the electronic system is a set-top box.

17. The method of claim 1, wherein the auxiliary memory is permanently lockable.

18. A method for controlling use of a cellular telephone, the method comprising the steps of:
   programming at least one unique code into an auxiliary memory of the cellular telephone, wherein the auxiliary memory is a lockable memory;
   comparing the at least one unique code to at least one component code; and
   controlling use of the cellular telephone based on a predefined relationship between the at least one unique code and the at least one component code.

19. The method of claim 18, further comprising the steps of:
   encrypting an identification code using the at least one unique code; and
   allowing telephone calls to be made when the encrypted identification code matches the at least one component code.

20. The method of claim 19, wherein the identification code comprises an equipment serial number (ESN) and an international mobile equipment identifier (IMEI).

21. The method of claim 19, wherein the identification code comprises at least one bit provided by a cellular service provider in a signal received by the cellular telephone.

22. The method of claim 18, wherein the at least one unique code is stored in a first segment of the auxiliary memory and the at least one component code is stored in a second segment of the auxiliary memory.

23. The method of claim 18, further comprising the step of allowing telephone calls to be made when the at least one unique code matches the at least one component code.

24. The method of claim 18, further comprising the step of setting the at least one component code in a permanently lockable memory of at least one component of the cellular telephone.

25. The method of claim 24, wherein the at least one component comprises a micro controller, an application specific integrated circuit, a central processor unit, and a signal processor.

26. The method of claim 25, further comprising the step of setting the at least one component code in at least one component of the cellular telephone infrastructure.

27. The method of claim 26, wherein the at least one component of the cellular telephone infrastructure comprises a subscriber identification module (SIM) card comprising a user profile.

28. The method of claim 18, wherein the step of controlling use comprises using the at least one unique code and the at least one component code as an encryption validation key for system software of the cellular telephone.

29. The method of claim 18, wherein the main memory is a flash memory, wherein the main memory and the auxiliary memory are located on the same chip.

30. The method of claim 18, wherein the step of programming comprises programming a unique code into a first register of the auxiliary memory, wherein the programming is performed by the manufacturer of the main memory, wherein the first register is a 64-bit register.

31. The method of claim 30, further comprising the step of preventing modification of the unique code by locking the unique code into the first register using at least one lock bit of a first lock register.

32. The method of claim 18, wherein the step of programming comprises programming a unique code into a second register of the auxiliary memory, wherein the second register is a 64-bit register.

33. The method of claim 32, further comprising the step of preventing modification of the unique code by locking the unique code into the second register using at least one lock bit of a second lock register.

34. The method of claim 18, wherein the auxiliary memory is located outside of a main memory array space, wherein the auxiliary memory is permanently lockable.

35. An apparatus for controlling use of a cellular telephone comprising:
  an auxiliary memory comprising at least one unique code, wherein the auxiliary memory is lockable; and
  fraud prevention circuitry coupled to the auxiliary memory, the fraud prevention circuitry configured to retrieve at least one component code and compare the at least one unique code to the at least one component code, wherein the fraud prevention circuitry allows telephone calls to be made when the at least one unique code satisfies a predefined relationship with the at least one component code.

36. The apparatus of claim 35, wherein an identification code is encrypted using the at least one unique code, wherein telephone calls can be made when the encrypted identification code matches the at least one component code.

37. The apparatus of claim 35, wherein the at least one unique code is stored in a first segment of the auxiliary memory and the at least one component code is stored in a second segment of the auxiliary memory.

38. The apparatus of claim 35, wherein telephone calls can be made when the at least one unique code matches the at least one component code.

39. The apparatus of claim 35, wherein the at least one component code is retrieved from at least one component of the cellular telephone, wherein the at least one component comprises a micro controller, an application specific integrated circuit, a central processor unit, a portable subscriber identification module (SIM) card, and a signal processor.

40. The apparatus of claim 35, wherein the auxiliary memory is located outside of a main memory array space, wherein the auxiliary memory is a permanently lockable memory.

41. A cellular telephone comprising:
  a central processor unit and at least one application specific integrated circuit coupled to a bus;
  a main memory and an auxiliary memory coupled to the bus, the auxiliary memory comprising at least one unique code, wherein the auxiliary memory is located outside of a main memory array space, wherein the auxiliary memory is permanently lockable;
  fraud prevention circuitry coupled to the auxiliary memory, the fraud prevention circuitry configured to control use of the cellular telephone by retrieving at least one component code and comparing the at least one unique code to the at least one component code, wherein the fraud prevention circuitry allows telephone calls to be made when the at least one unique code satisfies a predefined relationship with the at least one component code.

42. The cellular telephone of claim 41, wherein an identification code is encrypted using the at least one unique code, wherein telephone calls can be made when the encrypted identification code matches the at least one component code.

43. The cellular telephone of claim 42, wherein the identification code comprises at least one bit stored in a main memory of the cellular telephone, at least one bit provided by a cellular service provider in a signal received by the cellular telephone, and at least one bit resident in system software of the cellular telephone.

44. The cellular telephone of claim 43, wherein the at least one unique code is stored in a first segment of the auxiliary memory and the at least one component code is stored in a second segment of the auxiliary memory, wherein the main memory and the auxiliary memory are located on the same chip.

45. A computer readable medium containing executable instructions which, when executed in a processing system, causes the system to perform the steps for controlling use of a cellular telephone comprising:
  programming at least one unique code into an auxiliary memory of the cellular telephone, wherein the auxiliary memory is a lockable memory;
  comparing the at least one unique code to at least one component code; and
  controlling use of the cellular telephone based on a predefined relationship between the at least one unique code and the at least one component code.

46. The computer readable medium of claim 45, wherein the executable instructions further cause the system to perform the step of allowing telephone calls to be made when the at least one unique code matches the at least one component code.

47. The computer readable medium of claim 45, wherein the at least one component code is set in a one-time programmable memory of at least one component of the cellular telephone, wherein the at least one component comprises a micro controller, an application specific integrated circuit, and a central processor unit.

48. The computer readable medium of claim 45, wherein the main memory is a flash memory, wherein the main memory and the auxiliary memory are located on the same chip.

49. The computer readable medium of claim 45, wherein the auxiliary memory is located outside of a main memory array space, wherein the auxiliary memory is a permanently lockable memory.

* * * * *